United States Patent Office 3,386,277
Patented June 4, 1968

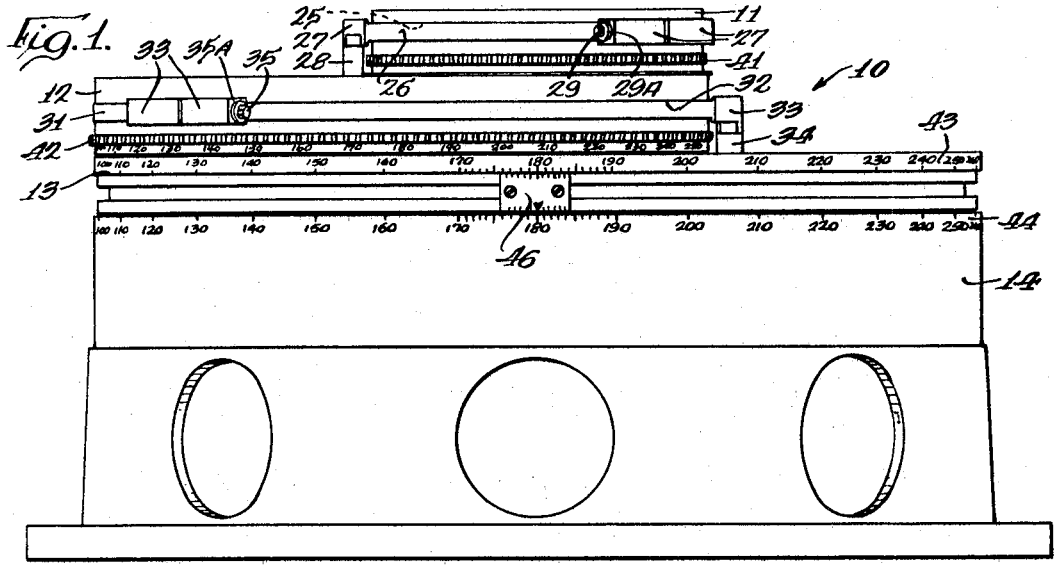

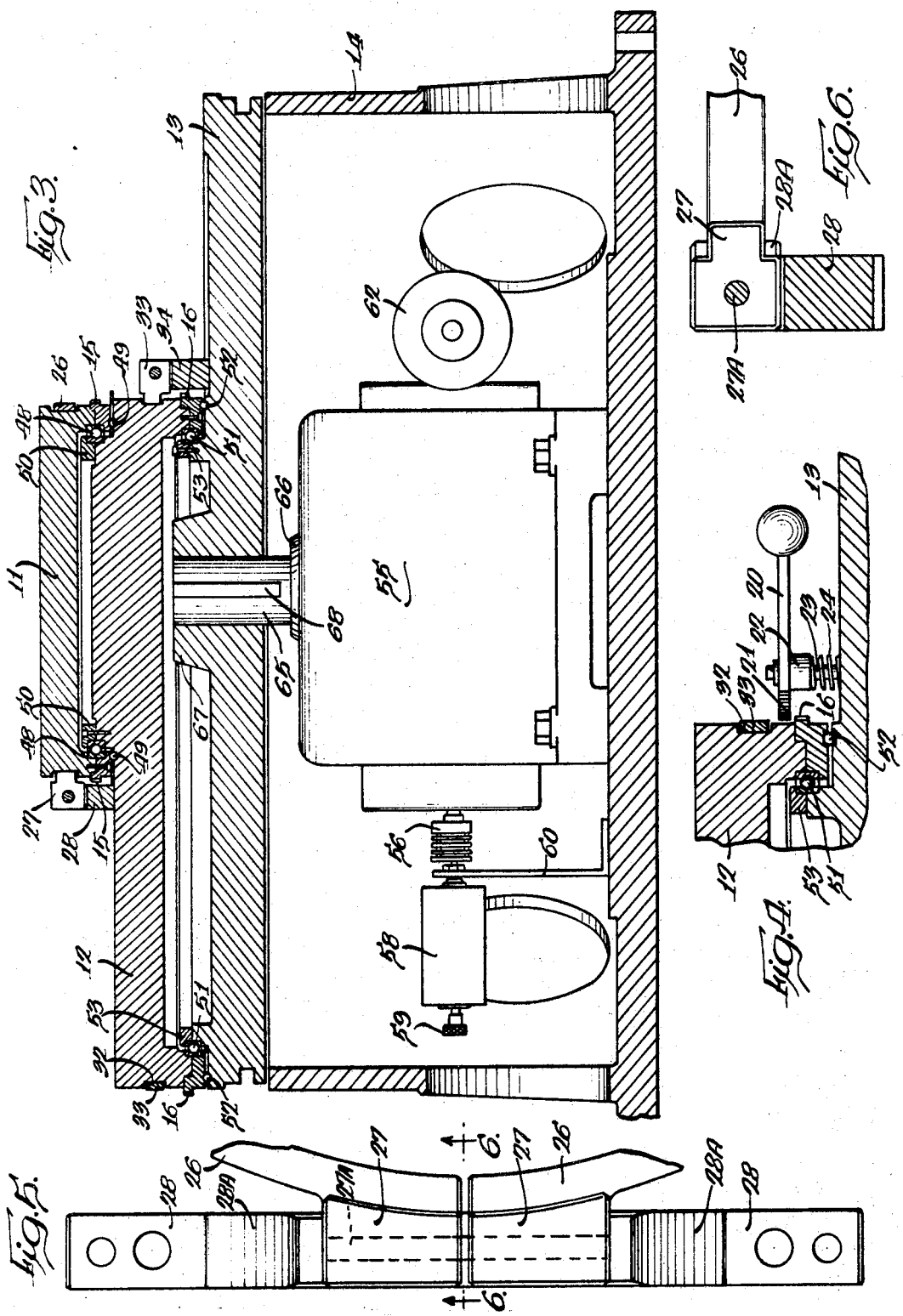

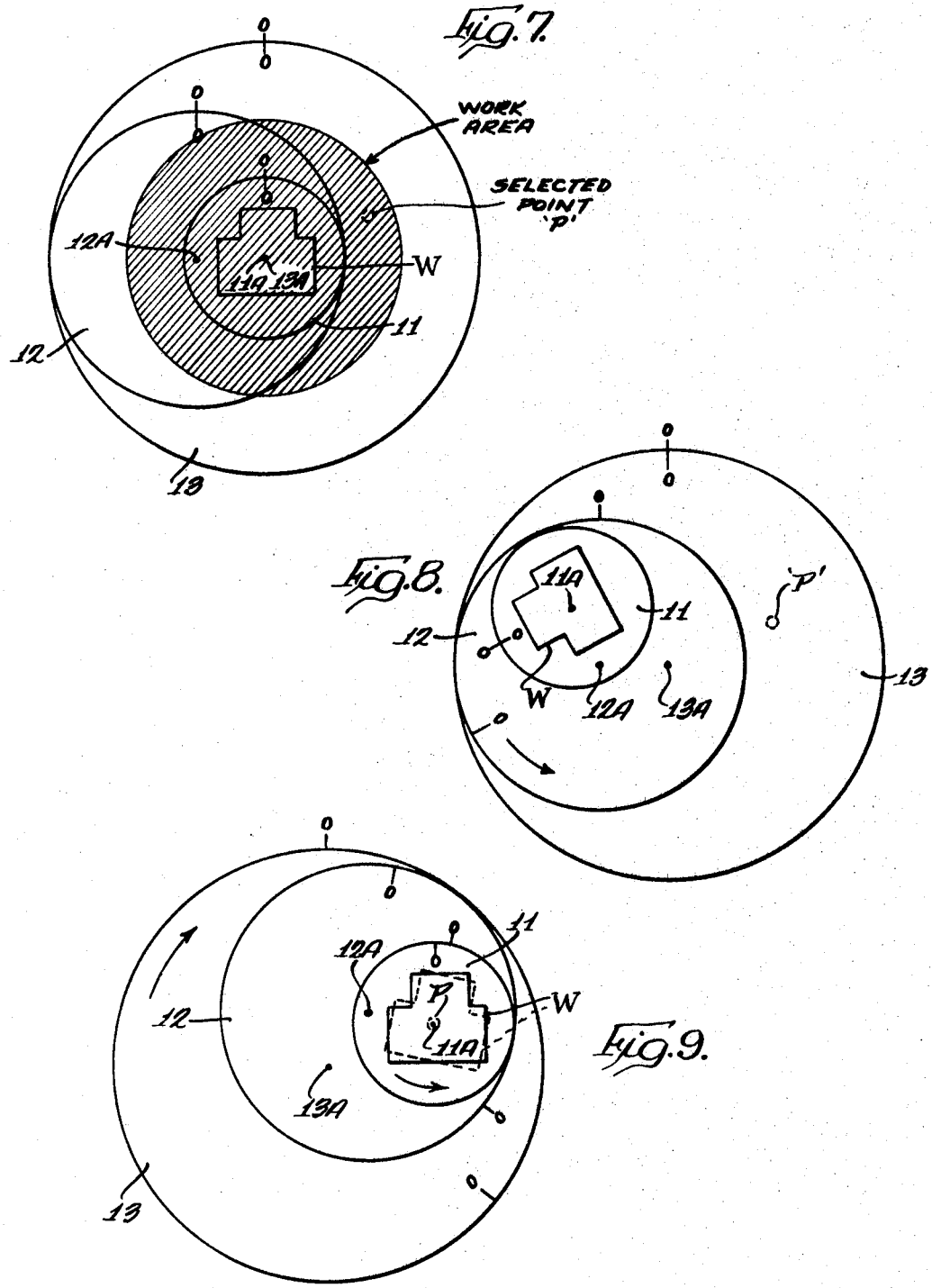

3,386,277
POSITIONING DEVICE
Louis W. Hennings, Marion, Va., assignor to Brunswick Corporation, a corporation of Delaware
Filed June 11, 1965, Ser. No. 463,227
6 Claims. (Cl. 73—1)

ABSTRACT OF THE DISCLOSURE

A device for positioning sighting instruments, comprising three generally parallel rotary members, each mounted for rotation about an axis eccentric relative to the next lowermost member, with means provided for locking the members against relative rotation.

---

This invention relates to positioning devices and more particularly to a device for positioning articles like radomes or the like in varying lateral positions while maintaining a generally fixed orientation to remote locations and permitting controlled scanning movement.

The device of the present invention is used to accurately position a radome or the like over a predetermined point in a limited area for testing purposes. Heretofore, the most direct method of accomplishing this, was by the use of a device permitting movement along independent perpendicular coordinates, as for example, the slide and cross slide of a lathe. However, since the positioning device may be used outdoors, the mutually perpendicular slides are difficult to protect from weather and elements. Thus there exists a need for a device which would be dependable and which would not require the taking of special precautionary measures to protect the device from the elements. The present device permits the positioning of a radome or a workpiece by incorporating three rotational movements rather than two rectilinear movements as in the case involving slides, and therefore, since the slides are not used, the steps needed for weather protection are not as complex.

An object of this invention is to provide a positioning device for locating an article in varying positions.

Another object of this invention is to provide a new and improved positioning device for locating a radome positioning fixture as used for the testing of radomes.

Still another object of this invention is to provide a positioning device requiring no slides, but having all rotary motions, thus facilitating the sealing of the moving parts against the weather and the elements.

A further object of this invention is to provide an article positioning device which is more compact than a positioning device utilizing slides, and has improved stability and rigidity as well as improved dependability.

Still further objects and advantages will become apparent from the following detailed description taken in connection with the accompanying drawings in which:

FIG. 1 is a side elevational view of the article positioning device embodying the present invention;

FIG. 2 is a plan view of the article positioning device embodying the present invention;

FIG. 3 is a vertical section of an enlarged scale taken generally along the line 3—3 of FIG. 2, showing the driving means of the device in full elevation;

FIG. 4 is a fragmentary vertical section on an enlarged scale taken generally along the line 4—4 of FIG. 2;

FIG. 5 is a fragmentary plan view partially showing the locking means of the rotary members of this invention;

FIG. 6 is a fragmentary vertical section on an enlarged scale taken generally along the line 6—6 of FIG. 5;

FIG. 7 is a schematic view showing the three rotary members of this invention at zero angular displacement;

FIG. 8 is a schematic view of the three rotary members showing the first member placed along the peripheray of the circular area selected for testing purposes; and FIG. 9 is a schematic view of the three rotary members showing the object positioned exactly over the selected point, the phantom lines indicating the positioning of the object in a down range direction.

While this invention is susceptible of embodiment in many different forms, there is shown in the drawings and will herein be described in detail an embodiment of the invention with the understanding that the present disclosure is to be considered as an exemplification of the principles of the invention and is not intened to limit the invention to the embodiment illustrated. The scope of the invention will be pointed out in the appended claims.

Referring now to the drawings, the device of this invention, generally designated 10, comprises a first rotary member 11 carrying an object W to be positioned, a second rotary member 12 carrying said first rotary member 11, a third rotary member 13 carrying said second rotary member 12, and a base 14 carrying said third rotary member 13. The axes of said three rotary members are arranged in parallel relationship to one another, the axis 12A of the second rotary member 12 being located an equal distance from the respective axes of the members 11 and 13. When the members 11, 12 and 13 are at zero angular displacement, the axes 11A and 13A of the members 11 and 13 respectively, are concentric. In the exemplary embodiment shown herein, all three of said rotary members, namely 11, 12 and 13, are of a circular configuration.

As best seen in FIG. 2, the members 11 and 12 have at their peripheries gear segments 15 and 16 respectively. An arm 17 having a gear segment 18 at its end nearest the member 11 is mounted by a stud 19 on the face of the second member 12. An arm 20 having a gear segment 21 at its end nearest the second rotary member 12 is pivotally mounted by a stud 22 on the face of the third rotary member 13. Since the function and the details of mounting of the arms 17 and 20 are the same, reference will be made herein to a specific mounting and a specific function for one of these arms.

As best seen in FIG. 4, the arm 20 having the gear segment 21 nearest the gear segment 16 on the periphery of the rotary member 12 is pivotally mounted on the face of the member 13. A stud 22 having a shaft 23 connects the arm 20 with the face of the member 13. A coil spring 24 is placed around the shaft 23 below the stud 22 so that it extends between the bottom of the stud 22 and the face of the rotary member 13. The purpose of the spring 24 is to hold the arm 20 with the gear segment 21 in a raised position above the gear segment 16 on the periphery of the member 12. Since the members 11 and 12 are rotated manually, the function of the arm 20 is to effect a precise manual control of the movement of the member 12. The manual rotation of the member 12 is assisted by the engagement and meshing of the gear segment 21 of the arm 20 with the gear segment 16 on the periphery of the member 12. The arm 20 with the gear segment 21 is normally held by the coil spring 24 above the gear segment 16 of the member 12 so that the segment 21 does not engage the segment 16 when there is no necessity to rotate the member 12. In order to engage the segment 21 with the segment 16, the arm 20 is depressed down and momentarily held in this depressed position until a proper meshing of the teeth in the gear segment 21 with the teeth in the gear segment 16 can be made.

As a feature of this device, the rotary members 11, 12 and 13 can be interlocked in a successive order. Thus the locking means are provided to lock the members 11 and 12, or the members 12 and 13, or the members 11, 12 and 13, thus subjecting any two successive members, or all three members, for rotation together as a unit. Since the locking means for the members are the same, a reference will be made herein to a specific locking means for locking the member 11 to the member 12.

As seen in FIG. 1, the locking means for locking the member 11 to the member 12 consists of a groove 25 which is formed around the periphery of the member 11. Placed in the groove 25 is a band 26. As best seen in FIG. 2, the band 26 is made in three segments each segment having an ear 27 at each of its ends, the ears 27 being made integral with a respective segment of the band 26 by means of welding or the like. The segments of the band 26 are connected by the bolts 29 through the ears 27 at two of the segmental joints. The ears 27 of the third joint are constrained by insertion into an anchor block 28 which is immovably fixed to the face of the member 12 by tight fitting dowels or the like The tightening of one of the bolts 29 by the operation of a knob 29A secured to the bolt 29 will cause the band 26 to clamp to the member 11 and at the same time cause the ears 27 at the segmental joint within the anchor block 28 to open into said anchor block 28 and thereby eliminate all of the lost motion in the anchorage. As best seen in FIGS. 5 and 6, the ears 27 are immovably held in the anchor block 28 by being forced against the abutments 28A of the anchor block 28. If necessary, a pin 27A can be inserted through the ears 27 and the anchor block 28 to additionally secure the ears 27 in the block 28.

The locking means providing for locking of the member 12 to the member 13 consists of a groove 31 formed around the perphery of the member 12 and a band 32 inserted in that groove. The band 32 is also made in three segments, each segment having an ear 33 at both of its ends. An anchor block 34 having abutments 34A, is immovably attached to the face of the member 13. The bolts 35 are placed through the ears 33 of two adjoining sections of the band 32 to secure such sections together. The band 32 being tightened by the operation of any one of the knobs 35A attached to the bolts 35. The operation of the locking means for the member 12 is identical to the operation of the heretofore described locking means for the member 11.

To provide for a proper angular alignment of the members 11, 12 and 13 each of said members has angular scale around its periphery. The scale 41 is attached to the periphery of the member 11, the scale 42 is attached to the periphery of the member 12 and the scale 43 is secured to the lower periphery of the member 13 while the top periphery of the base 14 is provided with a similar angular scale 44. Each member is equipped with a vernier scale, such as a vernier 45 indicated at FIG. 2 secured on the face of the member 13 and aligned for reading the scale around the periphery of the member 12 for rotation of the member 12 with respect to the member 13. The scales and the verniers facilitate the accurate angular adjustment of the respective members. A movable index block 46, shown in FIG. 1, having the upper and lower verniers, is attached to the member 13 by a clamping arrangement and used to establish proper alignment angles as later described.

As best seen in FIG. 3, the first rotary member 11 is supported on its bottom by the ball bearings 48, and a ring 50 furnishing the member 11 a support on top of the member 12 and providing for a proper rotation of the member 11. A tube 49, such as a tube made of Teflon, is a seal for excluding dust and other matter from the cavities of the bearings 48. The same features are used for supporting the member 12 on the member 13. As can be seen in FIGS. 3 and 4, the member 12 is supported by the ball bearings 51 and a ring 53, while a seal is provided by a tubing 52 to exclude dust from the cavities of bearings 51.

As heretofore explained, the members 11 and 12 are rotated manually. The member 13, however, is rotated by a power drive located inside the base 14. This power drive consists of a gear drive unit 55 connected at its left end to clutch coupling 56 which in turn is connected to a multiturn potentiometer 58. The potentiometer 58 has an adjustable control knob 59 for proper settings thereof. A bracket 60 attached to the bottom of the base 14 supports the potentiometer 58. The gear drive unit 55 is secured to the bottom of the base 14 and has at its right end of connection with a motorspeed reducer unit 62. A vertical rotary output shaft 65 extends from the gear drive unit 55 through the collar 66 to the hub 67 of the member 13. The hub 67 of the member 13 is secured to the shaft 65 by means of a key 68 and set screws 70, as seen in FIG. 2. Thus the rotation of the output shaft 65 transmits a motion to the hub 67 thereby rotating the member 13.

The positioning of the radome will be described referring to FIGS. 7–9. Referring now to FIG. 7, the verniers of the rotary members 11, 12 and 13 are placed in such a position that the bringing of all of the rotary members to zero angular position simultaneously, will cause the rotational axis 11A of the member 11 to be directly over the axis 13A of the member 13. The radome or the object W which is to be positioned, stands on top of the member 11 and is affixed thereto in alignment with the test range with all of the rotary members at zero angular positions.

The axis 11A or the center point of the rotary member 11 can be placed anywhere over a limited area of the base 14, said area being defined by a circle centered on the axis of the base 14 and having a radius equal to twice the distance by which the axis 12A of the member 12 is offset from the axis 13A of the member 13. This establishes a work area where the object W can be placed by rotating the rotary members of this device.

As shown in FIG. 8, the member 12 is rotated to a position that will place the axis 11A of the member 11 in the aforementioned work area exactly the same distance from the vertical axis of the base 14 as is the selected point P. When this position is obtained the member 12 can be locked to the member 13.

As shown in FIG. 9, the member 13 is rotated to a position that will place the axis 11A of the member 11 exactly over the selected point P, at which setting the movable index block 46, shown in FIG. 1, is brought to the zero on the scale 44 of the base 14, and there locked to the member 13. With the block 46 locked to the member 13 the rotation of the member 13 will be indicated by vernier scale of the block 46 as an azimuth angle read directly on the scale 44 of the base 14. With azimuth angle at zero. the member 11 can be rotated to a position indicated by the dotted lines in FIG. 9, to bring the object W, mounted on top of the member 11, into a proper alignment with the test range. Now the object W is facing down range and is in line with the selected point in the test range. At this stage the member 11 can be locked to the member 12 so that the three members 11, 12 and 13 will rotate as a unit and the azimuth angle of the sweep can be read on the scale 44 of the base 14 directly through the lower vernier of the movable block 46.

The angular settings of the members can be made quickly once the required angles of rotation have been first computed. Three set-up angles must be computed to establish the required displacement angle for the members 11, 12 and 13 respectively. The set-up procedure thus becomes as follows:

(1) Set the movable index block 46 reading the scale 43 on the member 13 to displacement angle required for the member 13 and lock the block 46 to the member 13.

(2) Set the member 12 to the displacement angle that is required for it, and lock the member 12 to the member 13.

(3) Set the member 11 to the displacement angle that is required for it, and lock the member 11 to the member 12.

With the members 11, 12 and 13 locked in these positions the lower vernier on the block 46 will indicate the azimuth angle of the object W on the scale 44 of the base 14.

I claim:

1. In an article positioning table structure for locating an article in varying lateral positions while maintaining a generally fixed orientation to a remote location, a first rotary member carrying an article to be positioned by rotating said member about its axis for determining oriented direction, a second rotary member carrying said first member for operating within certain sector to located position, a third rotary member carrying said second member for shifting said second member into various sectors, a base carrying said third member, said member having axes parallel to one another, and the axis of said second member being located an equal distance from the axes of said first and third members.

2. In an article positioning table structure, a first rotary member for carrying an article to be positioned by rotating said member about its axis for determining oriented direction, a second rotary member carrying said first member for operating within certain sector to located position, a third rotary member carrying said second member for shifting said second member into various sectors, a base carrying said third member, said members having axes parallel to one another, the axis of said second member being located an equal distance from the axes of said first and third members, calibrating means for measuring the angular displacement between said members, locking means for securing the two immediately successive members together, and driving means for rotating said members.

3. A structure of claim 2 wherein said locking means comprises a band positioned about the periphery of one of said members and an anchor block secured to the other of said members, and means to connect said band with said anchor block for locking said two members together.

4. A structure of claim 2 wherein said driving means comprises, a powered gear drive unit having an output shaft connected to the hub of said third rotary member for rotating said member under power, a lever pivotally mounted on the face of said third member and having a gear segment formed at one end thereof for engaging a gear segment on the periphery of said second rotary member for controlling the manual rotation of said second member, and a lever pivotally mounted on the face of said second rotary member and having a gear segment formed at one end thereof for engaging a gear segment on the periphery of said first rotary member for controlling the manual rotation of said first member.

5. A structure of claim 2 wherein said calibrating means comprises scales positioned about the peripheries of said rotary members and the upper peripheral edge of said base, a movable block calibrated as a vernier scale and slidably secured to the periphery of said third rotary member for reading the scales of said base and said third rotary member, a vernier index secured to the face of said third member for reading the angular displacement of said second member with reading the angular displacement of said second member with respect to said third member, and a vernier index secured to the lower peripheral edge of said first member for reading the angular displacement of said first member with respect to said second member.

6. A structure having an upper rotary member and a lower rotary member carrying said upper member, an adjustable locking band mounted about the periphery of said upper member, an anchor block having abutments formed thereon and secured to the face of said lower member, said band being composed of sections, each of said sections having ears formed thereon for engaging the ears of other sections and providing interconnections of said sections to form a band, the ears of two sections located adjacent said anchor block being positioned within said abutments in said block so that tightening of the band by bringing together its other ears shall cause the ears within the anchor abutments to open slightly to bear forcibly against the inner faces of the abutments and thus cause the band to be positively immobile rotationally with respect to the lower rotary member and when the clamping force is released the ears of the band within the abutments shall be free floating within the abutments and the entire band shall then be free floating on the upper rotary member.

References Cited

UNITED STATES PATENTS

| | | | |
|---|---|---|---|
| 2,432,058 | 12/1947 | Wickens et al. | 90—58.3 |
| 2,424,485 | 6/1947 | Miller | 77—62 |
| 2,468,252 | 4/1949 | Borland | 188—77 X |
| 3,086,409 | 4/1963 | Budney et al. | 33—174 |
| 2,445,132 | 7/1948 | Berman | 250—51.5 |

FOREIGN PATENTS 1,106,789   6/1955   France.

DAVID SCHONBERG, *Primary Examiner.*

S. CLEMENT SWISHER, *Examiner.*